US011838844B2

(12) United States Patent
Cox et al.

(10) Patent No.: US 11,838,844 B2
(45) Date of Patent: *Dec. 5, 2023

(54) SYSTEMS AND METHODS FOR SECURE LOCALIZED COMMUNICATIONS IN A LOCAL COMMUNICATIONS NETWORK

(71) Applicant: H.M. Electronics, Inc., Carlsbad, CA (US)

(72) Inventors: Maisha Makeda Cox, Smyrna, GA (US); Michael Scott Hubbard, Winter Garden, FL (US)

(73) Assignee: H.M. Electronics, Inc., Carlsbad, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/724,196

(22) Filed: Apr. 19, 2022

(65) Prior Publication Data

US 2022/0240071 A1   Jul. 28, 2022

Related U.S. Application Data

(63) Continuation of application No. 17/153,832, filed on Jan. 20, 2021, now Pat. No. 11,317,265, which is a continuation of application No. 16/683,610, filed on Nov. 14, 2019, now Pat. No. 10,924,906.

(51) Int. Cl.
*H04W 4/80* (2018.01)
*H04W 4/12* (2009.01)
*H04W 76/10* (2018.01)
*H04W 84/12* (2009.01)

(52) U.S. Cl.
CPC ............... *H04W 4/80* (2018.02); *H04W 4/12* (2013.01); *H04W 76/10* (2018.02); *H04W 84/12* (2013.01)

(58) Field of Classification Search
CPC ......... H04W 4/80; H04W 4/12; H04W 76/10; H04W 84/12; H04W 4/33
See application file for complete search history.

(56) References Cited

U.S. PATENT DOCUMENTS

| 9,155,026 | B2* | 10/2015 | Wang | H04W 48/10 |
| 10,044,601 | B2* | 8/2018 | Xie | H04W 4/80 |
| 10,846,668 | B1* | 11/2020 | Hill | G06Q 20/381 |
| 10,924,906 | B1* | 2/2021 | Cox | H04W 76/10 |
| 11,317,265 | B2 | 4/2022 | Cox | |

(Continued)

*Primary Examiner* — Ankur Jain
(74) *Attorney, Agent, or Firm* — ESPLIN & ASSOCIATES, PC

(57) ABSTRACT

Systems and methods for facilitating secure localized communications in a local communications network are disclosed. Exemplary implementations may: detect proximity of portable communication devices; pair a central communication hub with a first portable communication device and pair the central communication hub with a second portable communication device; receive instructions, from a first client computing platform that is associated with a first supervisory user; generate the one or more messages for transmission to the one or more portable communication devices; and transmit the one or more messages to the one or more portable communication devices via the secondary wireless communication links such that a first message is transmitted to the first portable communication device.

20 Claims, 4 Drawing Sheets

(56) References Cited

U.S. PATENT DOCUMENTS

| | | | |
|---|---|---|---|
| 2015/0318874 A1* | 11/2015 | Donaldson | H04B 1/00 367/135 |
| 2016/0150069 A1* | 5/2016 | Chen | H04M 1/72415 455/420 |
| 2016/0227354 A1* | 8/2016 | Zhao | H04W 4/80 |
| 2016/0247113 A1 | 8/2016 | Rademaker | |
| 2017/0024805 A1 | 1/2017 | Tepfenhart, Jr. | |
| 2018/0330582 A1* | 11/2018 | Lin | H04W 68/005 |
| 2019/0141786 A1* | 5/2019 | Park | H04W 92/18 |
| 2020/0193374 A1* | 6/2020 | Nagarathinam | H04W 4/35 |
| 2020/0265665 A1* | 8/2020 | Nandakumar | G06Q 10/0836 |
| 2021/0153000 A1 | 6/2021 | Cox | |
| 2022/0038570 A1 | 2/2022 | Stegall | |

* cited by examiner

SYSTEMS AND METHODS FOR SECURE LOCALIZED COMMUNICATIONS IN A LOCAL COMMUNICATIONS NETWORK

FIELD OF THE DISCLOSURE

The present disclosure relates to systems and methods for facilitating localized communications in a local communications network.

BACKGROUND

Communication systems using a central communication device and an end-user communication device are known.

SUMMARY

One aspect of the present disclosure relates to a system configured for facilitating localized communications in a local communications network. The system may include a central communication hub, one or more information processing units, electronic storage, one or more hardware processors configured by machine-readable instructions, one or more client computing platforms, and/or other components. The client computing platforms may include portable communication devices. The processor(s) may be configured to detect proximity of portable communication devices. The proximity may be detected through a short-range wireless communication protocol. The portable communication devices may include a first portable communication device, a second portable communication device, and/or other portable communication devices. The first portable communication device may be associated with a first user. The second portable communication device may be associated with a second user. The processor(s) may be configured to pair the central communication hub with the first portable communication device and pair the central communication hub with the second portable communication device. The pairing may establish secondary wireless communication links. The secondary wireless communication links may provide point-to-point connections with the central communication hub. The processor(s) may be configured to receive instructions, from a first client computing platform that is associated with a (first) supervisory user. The may instructions instruct to transmit one or more messages to one or more portable communication devices associated with one or more other users. The instructions may be received by the central communication hub via a primary wireless communication link. The one or more portable communication devices may include the first portable communication device and the second portable communication device. The processor(s) may be configured to generate the one or more messages for transmission to the one or more portable communication devices. The one or more messages may be in accordance with the received instructions. The processor(s) may be configured to transmit the one or more messages to the one or more portable communication devices via the secondary wireless communication links such that a first message is transmitted to the first portable communication device.

Another aspect of the present disclosure relates to a method for facilitating localized communications in a local communications network. The method may include detecting proximity of portable communication devices. The proximity may be detected through a short-range wireless communication protocol. The portable communication devices may include a first portable communication device, a second portable communication device, and/or other portable communication devices. The first portable communication device may be associated with a first user. The second portable communication device may be associated with a second user. The method may include pairing the central communication hub with the first portable communication device and pairing the central communication hub with the second portable communication device. The pairing may establish secondary wireless communication links. The secondary wireless communication links may provide point-to-point connections with the central communication hub. The method may include receiving instructions, from a first client computing platform that is associated with a (first) supervisory user. The may instructions instruct to transmit one or more messages to one or more portable communication devices associated with one or more other users. The instructions may be received by the central communication hub via a primary wireless communication link. The one or more portable communication devices may include the first portable communication device and the second portable communication device. The method may include generating the one or more messages for transmission to the one or more portable communication devices. The one or more messages may be in accordance with the received instructions. The method may include transmitting the one or more messages to the one or more portable communication devices via the secondary wireless communication links such that a first message is transmitted to the first portable communication device.

As used herein, any association (or relation, or reflection, or indication, or correspondency) involving central communication hubs, information processing units, processors, client computing platforms, portable communication devices, communication protocols, connections, instructions, messages, user interfaces, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
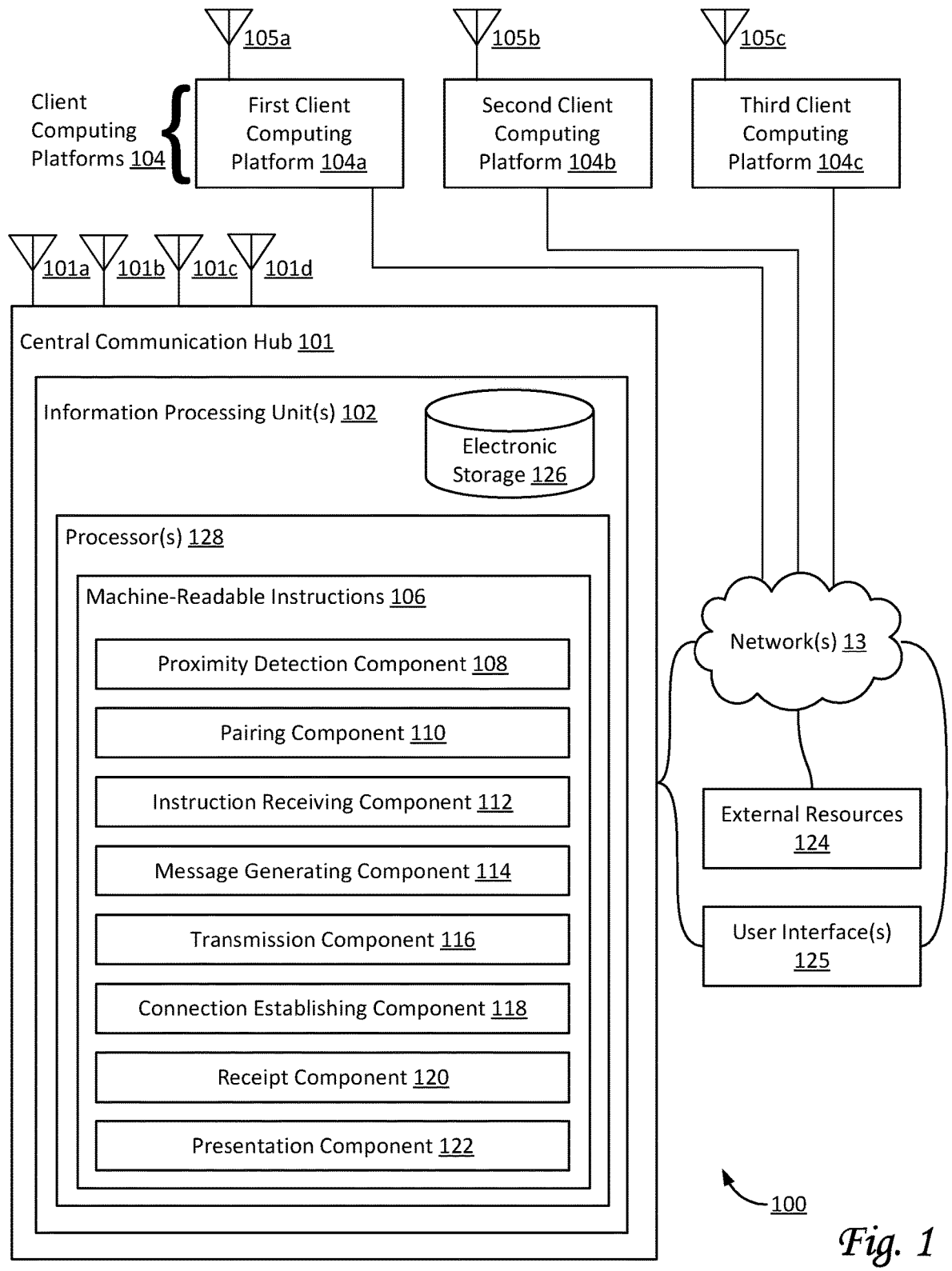
FIG. 1 illustrates a system configured for facilitating localized communications in a local communications network, in accordance with one or more implementations.

FIG. 1 illustrates a system 100 configured for facilitating localized communications in a local communications network, in accordance with one or more implementations. In some implementations, the localized communications may be secured, e.g., by encryption, authentication, etc. System 100 may be referred to as a communication system. In some implementations, system 100 may include one or more central communication hubs 101, one or more information processing units 102, electronic storage 126, one or more client computing platforms 104, external resources 125, one or more user interfaces 125, and/or other components. In some implementations, system 100 may include one or more repeaters that are configured to extend the effective range of one or more central communication hubs 101 to enable localized communications in a greater area. Client computing platforms 104 may include portable communication devices and/or other computing platforms. Central communication hub 101 and/or information processing unit(s) 102 may be configured to communicate with one or more client computing platforms 104 according to a client/server architecture, a point-to-point architecture, and/or other architectures. Client computing platform(s) 104 may be configured to communicate with other client computing platforms via central communication hub 101, information processing unit(s) 102, and/or other components. Users may access system 100 via client computing platform(s) 104. Client computing platforms 104 may include a first client computing platform 104a, a second client computing platform 104b, a third client computing platform 104c, and/or other client computing platforms. First client computing platform 104a may be associated with a first user (e.g., a supervisory user), second client computing platform 104b may be associated with a second user, third client computing platform 104c may be associated with a third user, and so forth. The portable communication devices may include a first portable communication device, a second portable communication device, a third portable communication device, and so forth. In some implementations, the local communications network may include a local area network. Alternatively, and/or simultaneously, in some implementations, the local communications network may include a personal area network. For example, the local communications network may be used in a restaurant, a service location, an office, a building, and/or in other localized areas.

Central communication hub 101 may include one or more of information processing units 102, electronic storage 126, a first antenna 101a, a second antenna 101b, a third antenna 101c, a fourth antenna 101d, and/or other components. In some implementations, central communication hub 101 may be referred to as a communication device. In some implementations, central communication hub 101 may be configured to facilitate localized communications in a local communications network among a set of client computing platforms 104, such as, by way of non-limiting example, first client computing platforms 104a, second client computing platforms 104b, third client computing platforms 104c, and/or other client computing platforms. In some implementations, individual antennas of central communication hub 101 may be configured to operate in conjunction with individual transceivers that are included in central communication hub 101 (not depicted).

Central communication hub 101 may use different communication protocols, communication formats, and/or communication links to communicate with different ones (and/or different types) of client computing platforms 104. For example, central communication hub 101 may use a primary wireless communication link to communicate with first client computing platform 104a (e.g., a tablet associated with a supervisory user, the tablet having a graphical user interface, e.g., including a touchscreen). In some implementations, communication via the primary wireless communication link may be based on the (IEEE) 802.11 family of standards. For example, in some implementations, the primary communication link may be a Wi-Fi communication link. In some implementations, central communication hub 101 may use first antenna 101a (and a corresponding transceiver) to transmit and/or receive information over the primary communication link. In some implementations, communication over the primary communication link may be supported in system 100 without the need or use of cellular networks or public networks.

For example, central communication hub 101 may use a secondary wireless communication link to communicate with second client computing platform 104b (e.g., a smart band, a call-for-service button, and/or other communication device). In some implementations, communication via the secondary wireless communication link may be based on the Bluetooth family of standards. For example, in some implementations, the secondary communication link may be a Bluetooth Low Energy (BLE) communication link. In some implementations, communication over the secondary communication link may be point-to-point. In some implementations, central communication hub 101 may use second antenna 101b (and a corresponding transceiver) to transmit and/or receive information over the secondary communication link. In some implementations, communication over the secondary communication links may be supported in system 100 without the need or use of cellular networks or public networks.

For example, central communication hub 101 may use a tertiary wireless communication link to communicate with third client computing platform 104c. In some implementations, communication via the tertiary wireless communication link may be based on one or more asynchronous protocols used to transmit data to pagers. For example, in some implementations, the tertiary communication link may be a Post Office Code Standardisation Advisory Group (POCSAG) communication link. In some implementations, central communication hub 101 may use third antenna 101c (and a corresponding transceiver) to transmit and/or receive information over the tertiary communication link.

For example, central communication hub 101 may use a particular wireless communication link to communicate with one or more client computing platforms 104, including but not limited to first client computing platforms 104a, second client computing platforms 104b, third client computing platforms 104c, and/or other client computing platforms. In some implementations, communication via this particular wireless communication link may be based on a short-range wireless communication protocol, contact-less information, and/or near-field communication (NFC). In some implementations, central communication hub 101 may use fourth antenna 101d to transmit and/or receive information over this particular communication link. In some implementations, communication over this particular communication link may be supported in system 100 without the need or use of cellular networks or public networks.

Information processing unit(s) 102 may be configured by machine-readable instructions 106. Machine-readable instructions 106 may include one or more instruction components. The instruction components may include computer program components. The instruction components may include one or more of proximity detection component 108, pairing component 110, instruction receiving component 112, message generating component 114, transmission component 116, connection establishing component 118, receipt component 120, presentation component 122, and/or other instruction components.

Proximity detection component 108 may be configured to detect proximity between different components of system 100. For example, proximity detection component 108 may be configured to detect proximity of central communication hub 101 to one or more client computing platforms 104 (such as, e.g., one or more portable communication devices). In some implementations, portable communication devices may include one or more smart bands that are configured to receive and display incoming text messages and transmit outgoing data messages. In some implementations, smart bands may be basic communication devices configured to facilitate a limited set of types of communication and/or a limited set of messages. For example, in a service environment such as a restaurant, employees may wear smart bands such that a supervisory user can easily send messages to individual employees, particular types of employees, and/or groups of employees. In some implementations, smart bands may be configured to facilitate basic replies, for example by selecting one response from a limited set of responses. To support such basic replies, smart bands may not need a full-fledged and/or advanced user interface. Instead, a few buttons and a basic display (e.g., a text-only display) may be sufficient to support many use cases. Alternatively, and/or simultaneously, in some implementations, portable communication devices may include one or more call-buttons that are configured to transmit individual data messages via central communication hub 101 to one or more client computing platforms 104, such as, by way of non-limiting example, first client computing platform 104a. For example, in a service environment such as a restaurant, clients and/or guests may use a call-button to request service (e.g., generic and/or specific service). In some implementations, such requests may be transferred to a tablet and presented to a supervisory user, to a particular user with a particular responsibility, and/or to one or more other users.

In some implementations, proximity detection may be based on a short-range wireless communication protocol. In some implementations, the short-range wireless communication protocol may support contact-less communication. In some implementations, the short-range wireless communication protocol may be based on near-field communication (NFC). In some implementations, short-range may be within 2, 3, 4, 5, and/or more than 5 inches. In some implementations, proximity detection of the portable communication devices may be based on electromagnetic induction that is powered by central communication hub 101. In some implementations, proximity may be detected by central communication hub 101. For example, in a service environment such as a restaurant, individual employees may use individual second client computing platforms 104b (e.g., smart bands). In some implementations, proximity detection component 108 may be configured to detect proximity between individual second client computing platforms 104b and central communication hub 101 (in particular, through fourth antenna 101d), through the use of near-field communication (NFC).

Pairing component 110 may be configured to pair different components of system 100 to facilitate communication. As used herein, the term "pairing" may refer to the process of establishing connections for communication, in particular wireless communication. For example, pairing component 110 may be configured to pair central communication hub 101 with a first portable communication device, pair central communication hub 101 with a second portable communication device, and so forth. In some implementations, an individual pairing may establish an individual primary wireless communication link between central communication hub 101 and first client computing platform 104a (e.g., a Wi-Fi communication link). In some implementations, individual pairings may establish individual secondary wireless communication links between central communication hub 101 and individual second client computing platforms 104b (e.g., individual BLE communication links). In some implementations, the secondary wireless communication links may provide point-to-point connections with central communication hub 101, including but not limited to point-to-point BLE connections. In some implementations, pairing component 110 may be configured to pair specific users to specific client computing platforms 104 (e.g., particular smart bands). For example, pairing component 110 may be configured to register specific users to specific portable communication devices.

Instruction receiving component 112 may be configured to receive information and/or instructions, including but not limited to receiving information and/or instructions from first client computing platform 104a. In some implementations, received instructions may originate from and/or otherwise be associated with a supervisory user. In some implementations, received information may represent one or more messages. In some implementations, individual messages may include one or more of textual information, audio information, video information, and/or other information. The received instructions may instruct system 100 and/or components thereof to transmit one or more messages to one or more client computing platforms 104 (e.g., to portable communication devices) associated with one or more other users. In some implementations, the received instructions may instruct system 100 and/or components thereof to transmit one or more messages to one or more users. In some implementations, the instructions may be received by central communication hub 101 via a primary wireless communication link (e.g., a Wi-Fi communication link with a tablet). In some implementations, instruction receiving component 112 may be configured to determine, based on the received instructions, which one or more client computing platforms 104 and/or which one or more users should receive one or more of the transmitted messages.

Message generating component 114 may be configured to generate one or more messages for transmission to one or more client computing platforms 104 (e.g., to portable communication devices). The one or more messages may be in accordance with the instructions and/or information received by instruction receiving component 112. In some implementations, the received instructions may instruct to transmit a first message to both a first portable communication device and a second portable communication device. In some implementations, the received instructions may instruct to transmit a first message to a first portable communication device and a second message to a second portable communication device. In some implementations, message generating component 114 may be configured to determine, based on the received instructions, which one or more client computing platforms 104 and/or which one or more users should receive one or more of the transmitted messages.

Transmission component 116 may be configured to transmit one or more messages to one or more client computing platforms 104 (e.g., to one or more portable communication devices). In some implementations, transmission component 116 may be configured to transmit messages via one or more secondary wireless communication links. For example, a first message may be transmitted to a first portable communication device, a second message may be transmitted to a second portable communication device, and so forth. In some implementations, the first message may be different from the second message, in terms of human-readable content and/or human-intelligible content. In some implementations, transmission component 116 may be configured to transmit messages via one or more tertiary wireless communication links.

Figure 3:
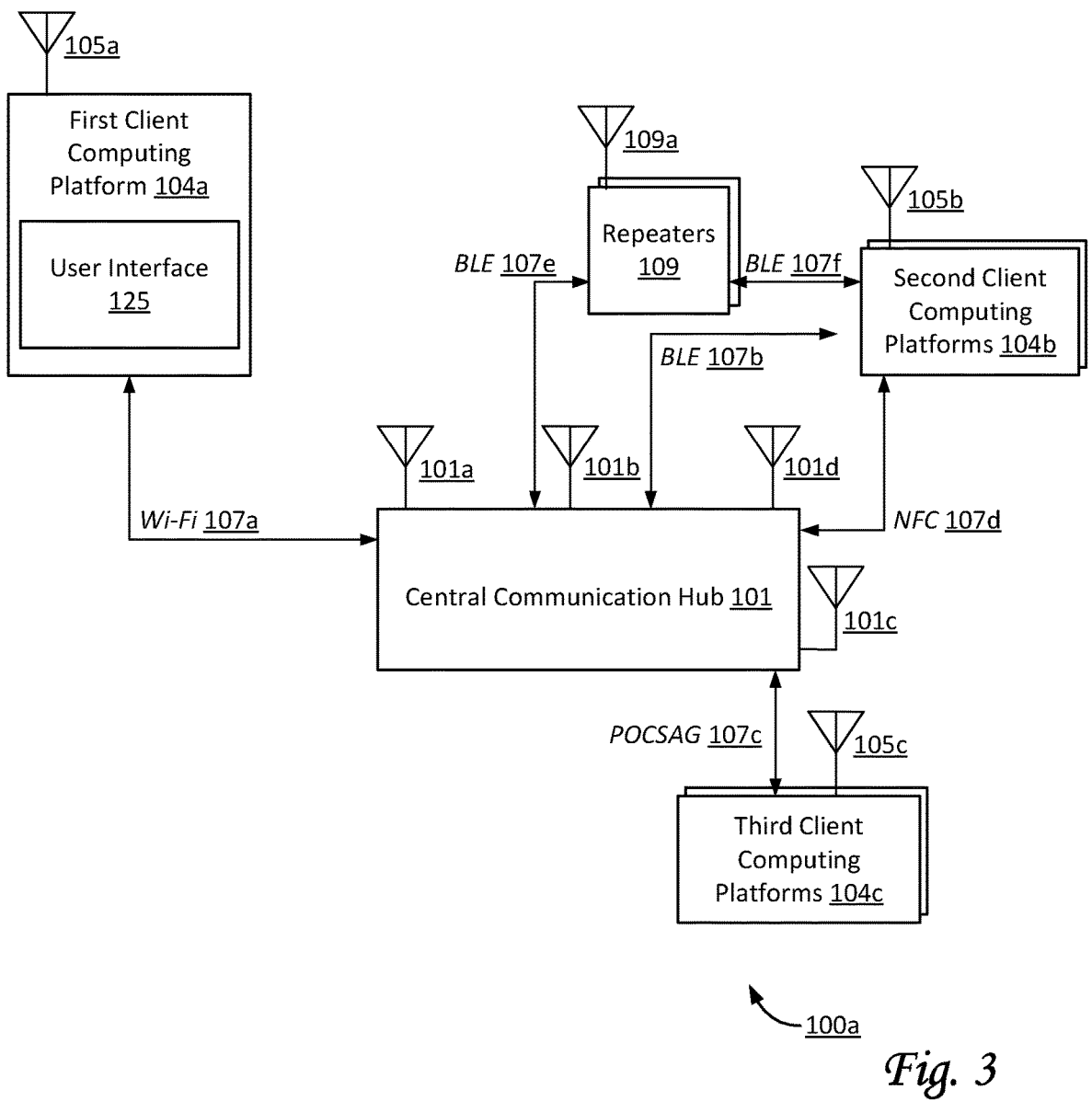
FIG. 3 illustrates an exemplary system configured for facilitating localized communications in a local communications network, in accordance with one or more implementations.

By way of non-limiting example, FIG. 3 illustrates an exemplary system 100a configured for facilitating localized communications in a local communications network. Exemplary system 100a may be similar to system 100. For example, exemplary system 100a may be a specific implementation of system 100 as described herein. As depicted, central communication hub 101 may include first antenna 101a, second antenna 101b, third antenna 101c, and fourth antenna 101d, and/or other components. Central communication hub 101 may use first antenna 101a to transmit and/or receive information over a Wi-Fi communication link 107a to/from first client computing platform 104a (here, a tablet having a graphical user interface 125). For example, instructions from a supervisory user (i.e. supervisory instructions) to transmit messages to other users may be transmitted over Wi-Fi communication link 107a. Central communication hub 101 may use second antenna 101b to transmit and/or receive information over multiple individual BLE communication links 107b to/from individual second client computing platforms 104b (here, multiple smart bands). For example, individual messages (based on supervisory instructions) may be transmitted over multiple individual BLE communication links 107b. In some implementations, central communication hub 101 may use second antenna 101b to transmit and/or receive information over multiple individual BLE communication links 107e to/from individual repeaters 109. Repeaters 109 may be configured to extend the effective range of central communication hub 101 to enable localized communications in a greater area, and reach more individual second client computing platforms 104b, e.g., by using one or more antennas 109a to transmit and/or receive information over multiple individual BLE communication links 107f to/from individual second client computing platforms 104b. For example, individual messages (based on supervisory instructions) may be transmitted over multiple individual BLE communication links 107e and 107f. Central communication hub 101 may use third antenna 101c to transmit and/or receive information over multiple individual POCSAG communication links 107c to/from individual third client computing platforms 104c (here, multiple pagers). For example, individual messages (based on supervisory instructions) may be transmitted over multiple individual POCSAG communication links 107c. Central communication hub 101 may use fourth antenna 101d to transmit and/or receive information over multiple sequential NFC communication links 107d to/from individual second client computing platforms 104b (here, multiple smart bands). In some implementations, transmitting and/or receiving information over multiple sequential NFC communication links 107d to/from individual second client computing platforms 104b may occur prior to the transmission of individual messages (based on supervisory instructions), e.g., as part of the operation of pairing component 110, connection establishing component 118, and/or other components of system 100a.

Figure 4:
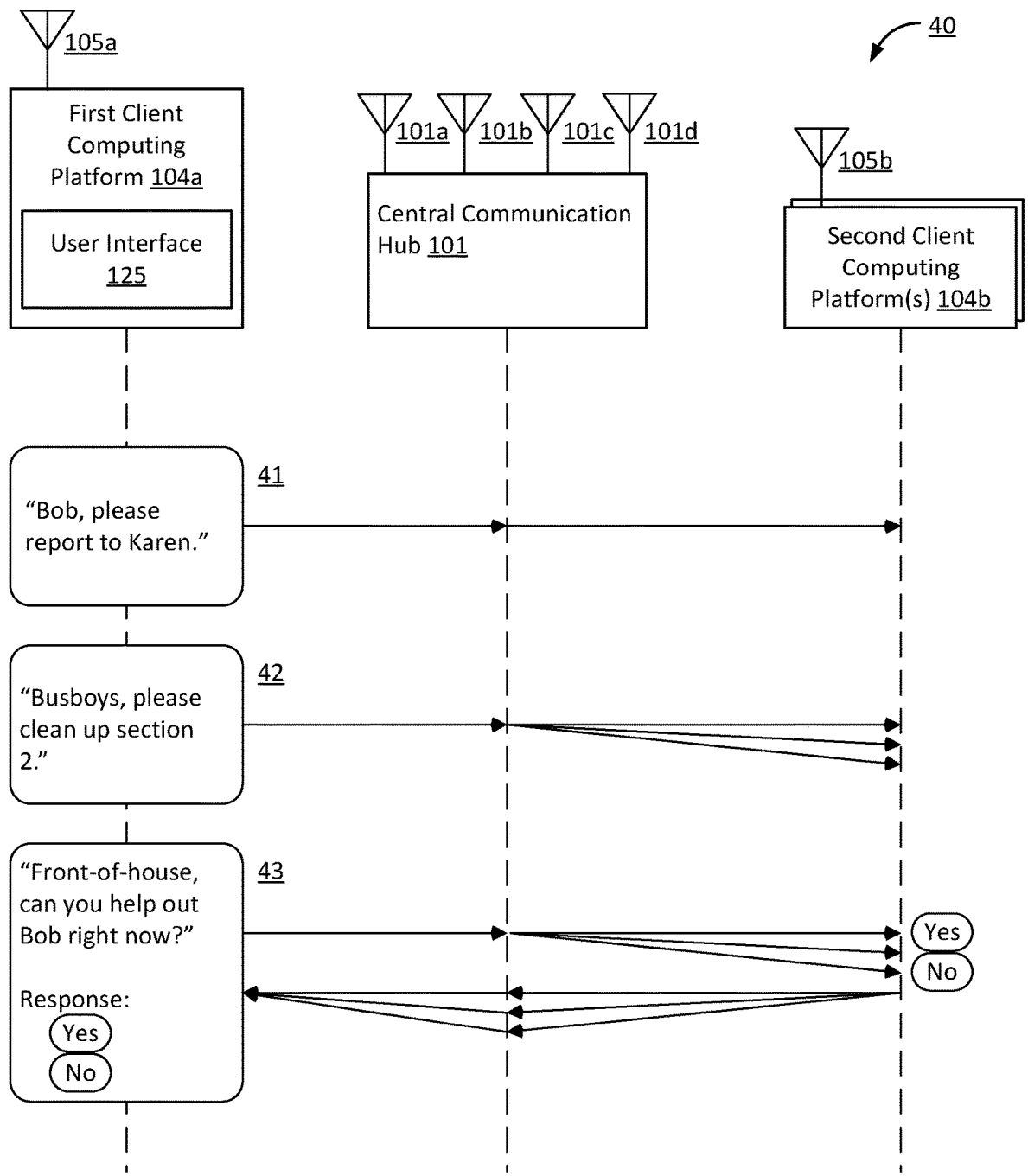
FIG. 4 illustrates exemplary localized communications as may occur in a system configured for facilitating localized communications in a local communications network, in accordance with one or more implementations.

By way of non-limiting example, FIG. 4 illustrates exemplary localized communications as may occur in a system similar to or the same as system 100, by way of a flow diagram 40. The localized communications depicted in flow diagram 40 may occur in a local communications network that includes first client computing platform 104a (e.g., a tablet), central communication hub 101, and one or more second client computing platforms 104b (e.g., a first smart band, a second smart band, and so forth). For example, the context for flow diagram 40 may be a service environment such as a restaurant, where employees may wear smart bands such that a supervisory user can easily send messages to individual employees, particular types of employees, and/or groups of employees. In a first communication 41, a supervisory user may enter and/or select the following message using user interface 125 of first client computing platform 104a: "Bob, please report to Karen." This message, along with one or more related instructions, may be transmitted to central communication hub 101, and from there to a particular second client computing platform 104b (i.e., a particular smart band) of a particular user, such as user Bob. Accordingly, first communication 41 may be a 1-on-1 communication from the supervisory user to Bob.

In a second communication 42, a supervisory user may enter and/or select the following message using user interface 125 of first client computing platform 104a: "Busboys, please clean up section 2." This message, along with one or more related instructions, may be transmitted to central communication hub 101, and from there to a particular group of second client computing platforms 104b (i.e., the particular set of smart bands of the group of busboys current at work in a restaurant). Accordingly, second communication 42 may be a 1-to-many communication from the supervisory user to a group of employees. In some implementations, the content of the individual messages transmitted to each portable communication device of the group of busboys may be identical. In some implementations, the content of the individual messages transmitted to each portable communication device of the group of busboys may be tailored, personalized, specific, and/or otherwise different and/or unique. In some implementations, a group of designated receivers of one or more messages may be based on one or more of a particular role and/or responsibility (e.g. within a restaurant), a current work schedule that specifies which employees are currently working and/or on-duty, a hierarchy among employees, and/or other considerations.

In a third communication 43, a supervisory user may enter and/or select the following message using user interface 125 of first client computing platform 104a: "Front-of-house, can you help out Bob right now?" This message, along with one or more related instructions, may be transmitted to central communication hub 101, and from there to a particular group of second client computing platforms 104b (i.e., the particular set of smart bands of the group of employees current at work as the "front-of-house" in a restaurant). Accordingly, third communication 43 may include a 1-to-many communication from the supervisory user to a group of employees, as well as many-to-one communications in response from the group of employees to the supervisory user. In some implementations, individual employees who receive a message on their smart band may respond, e.g., by pushing a button on their smart bands for either "yes" or "no." More elaborate types of responses are envisioned within the scope of this disclosure. Individual responses may be used to form individual response messages. Individual response messages may be transmitted by individual second client computing platforms 104b, and received by central communication hub 101. In some implementations, central communication hub 101 may transmit individual response messages (or individual messages based on individual responses) to first client computing platform 104a, which may present a presentation on user interface 125 to the supervisory user. In some implementations, first client computing platform 104a may be configured to aggregate received response messages into a single presentation. In some implementations, central communication hub 101 may aggregate multiple individual response messages to create an aggregated message for transmission to first client computing platform 104a, which may present a presentation on user interface 125 to the supervisory user. For example, the "yes" responses may be grouped together in the presentation to reflect that (a different) Bob and Karen responded "yes", while the "no" responses may be grouped together in the presentation to reflect which users responded "no", and so forth. The use of a single supervisory user in FIG. 4 is not intended to be limiting in any way. Localized communications may work using a network of multiple supervisory users and multiple groups of employees, who may interact in various and/or overlapping responsibilities such that individual communications may go from one or more users to one or more users.

Referring to FIG. 1, connection establishing component 118 may be configured to establish secure connections (e.g., secure point-to-point connections) between central communication hub 101 and one or more portable communication devices. In some implementations, a secure connection may be based on encrypting all or part of the communicated messages, e.g. through one or more cryptographic keys. Alternatively, and/or simultaneously, in some implementations, a secure connection may be based on one or more security keys. For example, the security keys may include one or more cryptographic keys. Alternatively, and/or simultaneously, in some implementations, a secure connection may be based on authentication (e.g., through one or more of user-specific passwords, user-specific biometric information, and/or other user-specific information). For example, in some implementations, cryptographic keys may be stored on central communication hub 101. For example, in some implementations, cryptographic keys may be stored on client computing platforms 104. In some implementations, one or more cryptographic keys may be shared between central communication hub 101 and an individual client computing platform 104 during pairing (e.g., by pairing component 110), and/or subsequent to authentication.

Receipt component 120 may be configured to receive response messages in response to a particular message, e.g., the message from the first portable communication device. A response message may be received on behalf of a particular user, e.g., via a secondary wireless communication link. In some implementations, one or more messages transmitted by transmission component 116 may be based on one or more response messages. For example, a message based on a received response message may be transmitted by transmission component 116 via the primary wireless communication link, to, e.g., first client computing platform 104a.

Presentation component 122 may be configured to effectuate presentations on one or more user interfaces 125, including but not limited to user interface 125 of first client computing platform 104a. In some implementations, a particular presentation may be based on a message transmitted by transmission component 116 (e.g., subsequent to receiving response messages by receipt component 120). In some implementations, a presentation may include aggregated information (e.g., by aggregating multiple received response messages).

In some implementations, information processing unit(s) 102, client computing platform(s) 104, and/or external resources 124 may be operatively linked via one or more electronic communication links. For example, such electronic communication links may be established, at least in part, via one or more networks including but not limited to the Internet and/or other networks. It will be appreciated that this is not intended to be limiting, and that the scope of this disclosure includes implementations in which information processing unit(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 124 may include sources of information outside of system 100, external entities participating with system 100, and/or other resources. In some implementations, some or all of the functionality attributed herein to external resources 124 may be provided by resources included in system 100.

Information processing unit(s) 102 may include electronic storage 126, one or more processors 128, and/or other components. Information processing unit(s) 102 may include communication lines, or ports to enable the exchange of information with a network and/or other computing platforms. Illustration of information processing unit(s) 102 in FIG. 1 is not intended to be limiting. Information processing unit(s) 102 may include a plurality of hardware, software, and/or firmware components operating together to provide the functionality attributed herein to information processing unit(s) 102. For example, information processing unit(s) 102 may be implemented by a cloud of computing platforms operating together as information processing unit(s) 102.

User interfaces 125 may be configured to facilitate interaction between users and system 100 and/or between users and client computing platforms 104. For example, user interfaces 125 may provide an interface through which users may provide information to and/or receive information from system 100. In some implementations, user interface 125 may include one or more of a display screen, touchscreen, monitor, a keyboard, buttons, switches, knobs, levers, mouse, speakers, headphones, microphones, sensors to capture voice commands, sensors to capture eye movement and/or body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100.

Electronic storage 126 may comprise non-transitory storage media that electronically stores information. The electronic storage media of electronic storage 126 may include one or both of system storage that is provided integrally (i.e., substantially non-removable) with information processing unit(s) 102 and/or removable storage that is removably connectable to information processing unit(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from information processing unit(s) 102, information received from client computing platform(s) 104, and/or other information that enables information processing unit(s) 102 to function as described herein.

Processor(s) 128 may be configured to provide information processing capabilities in information processing unit(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 108, 110, 112, 114, 116, 118, 120, and/or 122, and/or other components. Processor(s) 128 may be configured to execute components 108, 110, 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, and/or 122 are illustrated in FIG. 1 as being implemented within a single processing unit, in implementations in which processor(s) 128 includes multiple processing units, one or more of components 108, 110, 112, 114, 116, 118, 120, and/or 122 may be implemented remotely from the other components. The description of the functionality provided by the different components 108, 110, 112, 114, 116, 118, 120, and/or 122 described below is for illustrative purposes, and is not intended to be limiting, as any of components 108, 110, 112, 114, 116, 118, 120, and/or 122 may provide more or less functionality than is described. For example, one or more of components 108, 110, 112, 114, 116, 118, 120, and/or 122 may be eliminated, and some or all of its functionality may be provided by other ones of components 108, 110, 112, 114, 116, 118, 120, and/or 122. As another example, processor(s) 128 may be configured to execute one or more additional components that may perform some or all of the functionality attributed below to one of components 108, 110, 112, 114, 116, 118, 120, and/or 122.

Figure 2:
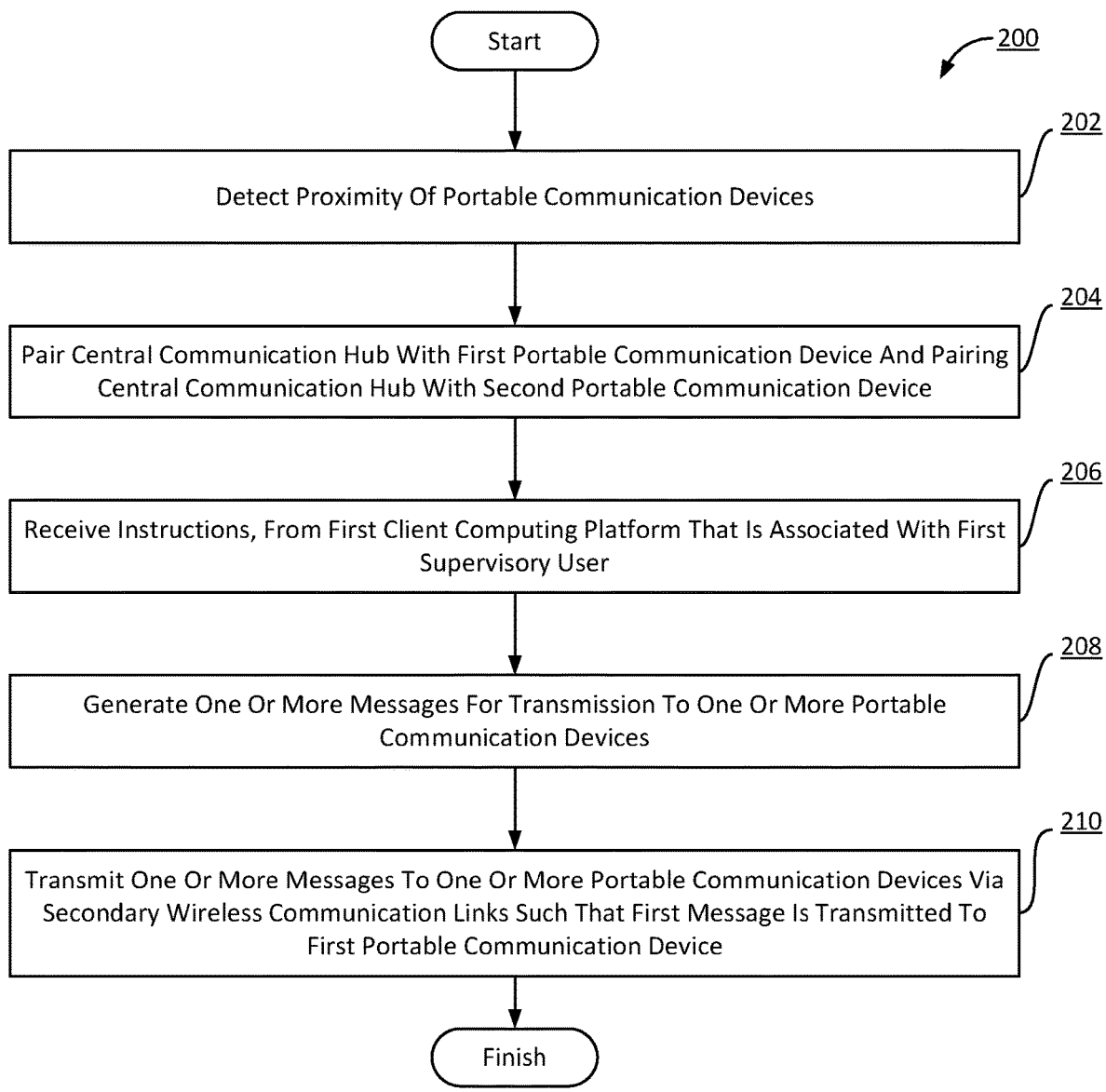
FIG. 2 illustrates a method for facilitating localized communications in a local communications network, in accordance with one or more implementations.

FIG. 2 illustrates a method 200 for facilitating secure localized communications in a local communications network, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include detecting proximity of portable communication devices. The proximity may be detected through a short-range wireless communication protocol. The portable communication devices may include a first portable communication device and a second portable communication device. The first portable communication device may be associated with a first user. The second portable communication device may be associated with a second user. The proximity may be detected by a central communication hub. Operation 202 may be performed by one or more hardware processors configured by machine-readable instructions including a component that is the same as or similar to proximity detection component 108, in accordance with one or more implementations.

An operation 204 may include pairing the central communication hub with the first portable communication device and pairing the central communication hub with the second portable communication device. The pairing may establish secondary wireless communication links. The secondary wireless communication links may provide point-to-point connections with the central communication hub. Operation 204 may be performed by one or more hardware processors configured by machine-readable instructions including a component that is the same as or similar to pairing component 110, in accordance with one or more implementations.

An operation 206 may include receiving instructions, from a first client computing platform that is associated with a first supervisory user. The may instructions instruct to transmit one or more messages to one or more portable communication devices associated with one or more other users. The instructions may be received by the central communication hub via a primary wireless communication link. The one or more portable communication devices may include the first portable communication device and the second portable communication device. Operation 206 may be performed by one or more hardware processors configured by machine-readable instructions including a component that is the same as or similar to instruction receiving component 112, in accordance with one or more implementations.

An operation 208 may include generating the one or more messages for transmission to the one or more portable communication devices. The one or more messages may be in accordance with the received instructions. Operation 208 may be performed by one or more hardware processors configured by machine-readable instructions including a component that is the same as or similar to message generating component 114, in accordance with one or more implementations.

An operation 210 may include transmitting the one or more messages to the one or more portable communication devices via the secondary wireless communication links such that a first message is transmitted to the first portable communication device. Operation 210 may be performed by one or more hardware processors configured by machine-readable instructions including a component that is the same as or similar to transmission component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for facilitating communications in a local communications network that includes a central communication hub, a first portable communication device, and a second portable communication device, wherein the first portable communication device is associated with a first user and the second portable communication device is associated with a second user, wherein the central communication hub has been paired with the first and second portable communication devices to establish secondary wireless communication links that provide point-to-point connections with the central communication hub, the system comprising:

one or more hardware processors configured by machine-readable instructions to:
receive one or more instructions, from a first client computing platform that is associated with a first supervisory user, wherein the one or more instructions instruct transmission of one or more messages to the first and second portable communication devices, wherein the one or more instructions are received by the central communication hub via a primary wireless communication link;
transmit the one or more messages to the first and second portable communication devices via the secondary wireless communication links, wherein content of the one or more messages are based on the one or more instructions as received, wherein the one or more messages include a first message to the first portable communication device; and
effectuate a presentation of the first message on a display of the first portable communication device such that the content of the first message is viewable by the first user associated with the first portable communication device.

2. The system of claim 1, wherein the one or more messages include a second message to the second portable communication device.

3. The system of claim 2, wherein the one or more hardware processors are further configured to effectuate a second presentation of the second message on a second display of the second portable communication device such that the content of the second message is viewable by the second user associated with the second portable communication device.

4. The system of claim 1, wherein the one or more hardware processors are further configured to:
detect a first proximity between the first communication device and the central communication hub; and
detect a second proximity between the second communication device and the central communication hub,
wherein pairing the central communication hub with the first communication device is performed subsequently to detection of the first proximity, and wherein pairing the central communication hub with the second communication device is performed subsequent to detection of the second proximity.

5. The system of claim 4, wherein the detection of the first proximity is (i) based on electromagnetic induction that is powered by the central communication hub, and/or (ii) detected through a short-range wireless communication protocol.

6. The system of claim 5, wherein the short-range wireless communication protocol supports contact-less communication, and wherein the short-range wireless communication protocol is based on near-field communication.

7. The system of claim 1, wherein the first portable communication device is a smart band that is configured to receive and display incoming text messages and transmit outgoing data messages, and wherein the first portable communication device further includes one or more call-buttons that are configured to transmit individual data messages via the central communication hub to the first client computing platform.

8. The system of claim 1, wherein the one or more hardware processors are further configured by machine-readable instructions to:
establish a secure point-to-point connection between the central communication hub and the first portable communication device based on one or more security keys.

9. The system of claim 1, wherein the primary wireless communication link is based on the 802.11 family of standards, and wherein the secondary wireless communication links are based on the Bluetooth Low Energy (BLE) protocol.

10. The system of claim 1, wherein the one or more hardware processors are further configured by machine-readable instructions to:
receive a response message in response to the first message, from the first portable communication device, wherein the response message is received on behalf of the first user via a secondary wireless communication link;
transmit a message to the first client computing platform, wherein the message is based on the response message, wherein the message is transmitted via the primary wireless communication link; and
effectuate a presentation on a user interface of the first client computing platform, wherein the presentation is based on the transmitted message.

11. A method for facilitating communications in a local communications network that includes a central communication hub, a first portable communication device, and a second portable communication device, wherein the first portable communication device is associated with a first user and the second portable communication device is associated with a second user, wherein the central communication hub has been paired with the first and second portable communication devices to establish secondary wireless communication links that provide point-to-point connections with the central communication hub, the method comprising:
receiving one or more instructions, from a first client computing platform that is associated with a first supervisory user, wherein the one or more instructions instruct transmission of one or more messages to the first and second portable communication devices, wherein the one or more instructions are received by the central communication hub via a primary wireless communication link;
transmitting the one or more messages to the first and second portable communication devices via the secondary wireless communication links, wherein content of the one or more messages are based on the one or more instructions as received, wherein the one or more messages include a first message to the first portable communication device; and
effectuating a presentation of the first message on a display of the first portable communication device such that the content of the first message is viewable by the first user associated with the first portable communication device.

12. The method of claim 11, wherein the one or more messages include a second message to the second portable communication device.

13. The method of claim 12, further comprising:
effectuating a second presentation of the second message on a second display of the second portable communication device such that the content of the second message is viewable by the second user associated with the second portable communication device.

14. The method of claim 11, further comprising:
detecting a first proximity between the first communication device and the central communication hub; and
detecting a second proximity between the second communication device and the central communication hub, wherein pairing the central communication hub with the first communication device is performed subsequently to detecting the first proximity, and wherein pairing the central communication hub with the second communication device is performed subsequent to detecting the second proximity.

15. The method of claim 14, wherein detecting the first proximity is (i) based on electromagnetic induction that is powered by the central communication hub, and/or (ii) performed through a short-range wireless communication protocol.

16. The method of claim 15, wherein the short-range wireless communication protocol supports contact-less communication, and wherein the short-range wireless communication protocol is based on near-field communication.

17. The method of claim 11, wherein the first portable communication device is a smart band that is configured to receive and display incoming text messages and transmit outgoing data messages, and wherein the first portable communication device further includes one or more call-buttons that are configured to transmit individual data messages via the central communication hub to the first client computing platform.

18. The method of claim 11, further comprising:
establishing a secure point-to-point connection between the central communication hub and the first portable communication device based on one or more security keys.

19. The method of claim 11, wherein the primary wireless communication link is based on the 802.11 family of standards, and wherein the secondary wireless communication links are based on the Bluetooth Low Energy (BLE) protocol.

20. The method of claim 11, further comprising:
receiving a response message in response to the first message, from the first portable communication device, wherein the response message is received on behalf of the first user via a secondary wireless communication link;
transmitting a message to the first client computing platform, wherein the message is based on the response message, wherein the message is transmitted via the primary wireless communication link; and
effectuating a presentation on a user interface of the first client computing platform, wherein the presentation is based on the transmitted message.

* * * * *